United States Patent [19]
Howald et al.

[11] Patent Number: 5,798,124
[45] Date of Patent: Aug. 25, 1998

[54] TIRE TREAD ELEMENT MOLD CHAMFER TO MODIFY RCF AND/OR RSAT USING THE EXISTING MOLD

[75] Inventors: John Alan Howald; Steven Craig Rohweder, both of Uniontown, Ohio

[73] Assignee: The Goodyear Tire & Rubber Company, Akron, Ohio

[21] Appl. No.: 588,036

[22] Filed: Jan. 17, 1996

[51] Int. Cl.$^6$ .................................................. B29C 35/00
[52] U.S. Cl. ............................... 425/32; 425/46; 425/195
[58] Field of Search ........................... 264/40.1, 315, 264/326; 425/32, 46, 195; 152/209 R, 209 D

[56] References Cited

U.S. PATENT DOCUMENTS

| | | |
|---|---|---|
| 3,562,861 | 2/1971 | Youngblood . |
| 4,279,856 | 7/1981 | Vente et al. ........................ 264/313 |
| 4,690,189 | 9/1987 | Bradisse et al. .................... 152/209 |
| 4,702,292 | 10/1987 | Brayer ................................. 152/209 |
| 5,109,903 | 5/1992 | Watanabe et al. ................... 152/209 R |
| 5,204,036 | 4/1993 | MacMillan .......................... 264/152 |
| 5,223,065 | 6/1993 | Kogure ................................ 156/110.1 |
| 5,234,326 | 8/1993 | Galli et al. ........................... 425/46 |
| 5,340,294 | 8/1994 | Kata .................................... 425/32 |

FOREIGN PATENT DOCUMENTS

| | | |
|---|---|---|
| 0599566 | 6/1994 | European Pat. Off. ........ B60C 11/00 |
| 605849A1 | 7/1994 | European Pat. Off. . |
| 3186405 | 8/1991 | Japan ............................. B60C 11/11 |

*Primary Examiner*—Mathieu D. Vargot
*Attorney, Agent, or Firm*—Roger D. Emerson

[57] ABSTRACT

A method and apparatus for modifying residual cornering force (RCF) or residual self-aligning torque (RSAT) of a tire 12. The tire mold 30 is modified by removing or adding removable chamfer mold pieces or material 50,150 to the interior surface of the tire mold 30. The removable chamfer mold pieces chamfer portions of the tire tread 10 at key locations, addition or deletion of such chamfer portions 50,150 at selected locations can modify the tire's RCF and/or RSAT parameters.

8 Claims, 5 Drawing Sheets

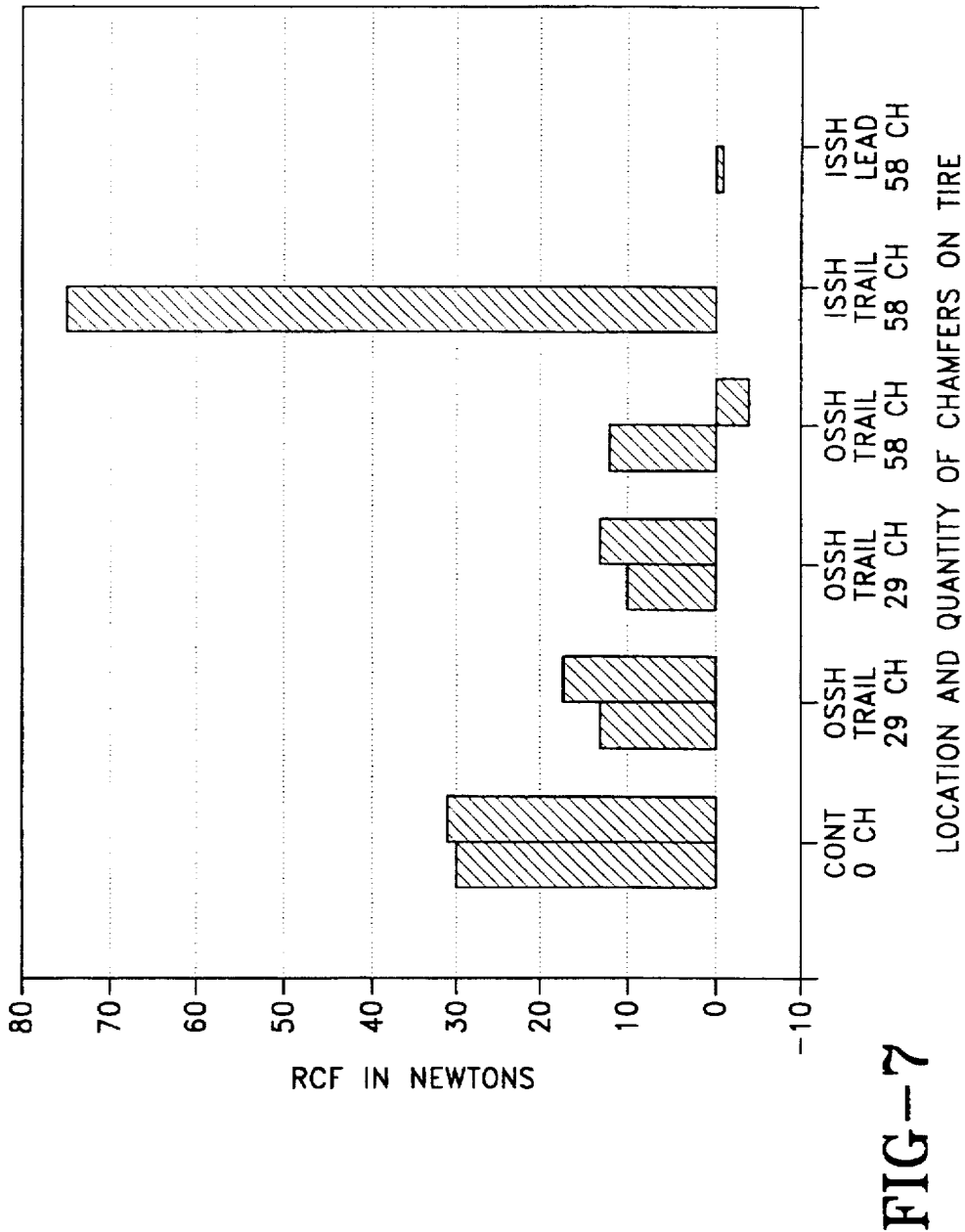

TIRE TREAD ELEMENT MOLD CHAMFER TO MODIFY RCF AND/OR RSAT USING THE EXISTING MOLD

BACKGROUND OF THE INVENTION

This invention pertains generally to the art of methods and apparatuses for molding pneumatic tires, and more particularly to a tire mold feature which creates chamfers on the edges of tire tread elements to vary the level of residual cornering force (also known as RCF) or residual self-aligning torque (also known as RSAT) in tires produced by the tire mold.

The chamfer feature may be built into a mold and then ground out wherever the chamfer is not desirable. Alternatively, the same effect can be obtained by adding chamfer inserts to the interior of a mold.

At a tire's point of contact with a road, also known as the contact patch, a tire experiences a moment about its vertical axis. This moment is referred to as a self-aligning torque. At a small slip angle where the self-aligning torque is zero, an additional horizontal force, referred to as residual cornering force, or RCF, is present. Even when lateral forces such as those relating to plysteer and conicity are reduced to zero, residual self-aligning torque, or RSAT may remain.

The level of RCF and/or RSAT of a tire varies with the shape and profile of the individual elements of the tire tread. In the past, one method employed by tire designers to vary RCF and/or RSAT of a certain tire design was to obtain a new tire mold with alterations, which may have included changes to the tire tread elements, to modify the original tread pattern. Manufacturing a new mold can be costly and time consuming, thereby slowing the development of new tire designs Applicants recognized a need for a more cost-effective solution to the RCF and/or RSAT problem than redesigning and modifying entire existing molds that produce tires with unacceptable RCF and/or RSAT. Applicants have developed a new mold and tire made there from that enables the tire designer to change the RCF and/or RSAT in tires from a mold by adding chamfer inserts to the mold to create the chamfer in the tire or more preferably by designing the mold with selected tread elements chamfered, and then modifying that mold to adjust the RCF or RSAT of the tire by selectively removing the mold material which created the chamfer.

The present invention contemplates a new and improved method and apparatus for modifying RCF and/or RSAT of a tire which is simple in design, effective in use, and overcomes the foregoing difficulties and others while providing better and more advantageous overall results.

SUMMARY OF THE INVENTION

In accordance with the present invention, a new and improved method and apparatus for modifying RCF and/or RSAT is provided which can be utilized with existing tire molds 30 or built into new molds.

The preferred invention includes a tire mold 30 for modifying the residual cornering force or residual self-aligning torque of a tire 12. The mold 30 has a molding means for molding treads. The molding means has a plurality of recesses 38 for forming tread elements 22, each tread element 22 having two or more edges 44. A plurality of the tread element forming recesses 38 have one or more portions 150 for forming chamfered edges 46 along the edge of the tread element 22 edges. Some of the chamfer forming portions 150 are selectively removed for modifying the residual cornering force or self-aligning torque of the molded tire 12. In one mold 30 a majority of tread element forming recess are initially fabricated having a chamfer forming portion 150 at one or more edges 44 of the respective tread element forming recess. The preferred method is to then choose predetermined chamfer forming portions 150 to modify the residual cornering force or residual self-aligning torque and to remove the chosen predetermined portions 150 of the mold such that selected edges 44 of the tread elements 22 are partially or completely unchamfered. Preferably the portions 150 are removed using a grinding procedure. The chamfer portion 46 can extend circumferentially or laterally or at any angle anywhere in between, depending on the angle of the tread element. The chamfer portion 46 as shown in FIG. 3 extends generally laterally along the edge of tread element 22. For the purpose of this invention a chamfer portion extends along an edge 44 of the tread element 22, the edge 44 being the intersection of a groove wall and the ground contacting surface 48 of the element 22. This chamfer portion can enable the tire designer to alter or modify a tire's performance without requiring a new mold to be built.

More particularly, in accordance with the present invention, a method of molding a tire for modifying residual cornering force of a tire includes the steps of providing chamfering means in the mold interior surface, measuring residual cornering force for tires produced by the tire mold, comparing measured residual cornering force for tires produced by the tire mold to a specification range, and selectively removing some or all of the chamfering means from the mold if measured residual cornering force is outside the specification range, thereby, removing the chamfering of the tread elements of the tire, which alters the RCF level of the tire.

According to another aspect of the present invention, the chamfering means comprises an insert insertable in the mold for chamfering an edge of a tread of a tire.

According to another aspect of the present invention, a method for modifying residual self-aligning torque of a tire, the tire being molded by a tire mold, the tire mold comprising a plurality of recesses for forming a tire tread, the method comprising the steps of measuring residual self-aligning torque for tires produced by the tire mold, comparing measured residual self-aligning torque for tires produced by the tire mold to a specification range, providing chamfering means for chamfering the tire tread produced by the tire mold if measured residual self-aligning torque is outside the specification range, and, chamfering the treads.

According to another aspect of the present invention, an insert for use with a tire mold for modifying residual cornering force or residual self-aligning torque of a tire, the insert comprising a first side and a second side, a chamfer edge, the chamfer edge being disposed on the first side, and, attaching means for attaching the second side to the tire mold.

One advantage of the present invention is the ability to modify rather than replace a tire mold to adjust RCF and/or RSAT of a tire.

Another advantage of the present invention is to reduce tire development costs by giving the tire engineer the capability of placing chamfer inserts into the tire molds, rather than replacing the entire tire mold.

Another advantage of the present invention is time savings derived from giving the tire designer the capability of modifying existing molds, rather than having to design, build, and receive new tire molds.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts. A preferred embodiment of these parts will be described in detail in the specification and illustrated in the accompanying drawings, which form a part of this disclosure and wherein:

FIG. 3 is a plan view of the portion of the tire tread illustrated in FIG. 1 after application of the invention and FIG. 3A is a cross section of the tread taken along line 3A—3A of FIG. 3;

DETAILED DESCRIPTION OF THE INVENTION

Figure 1:
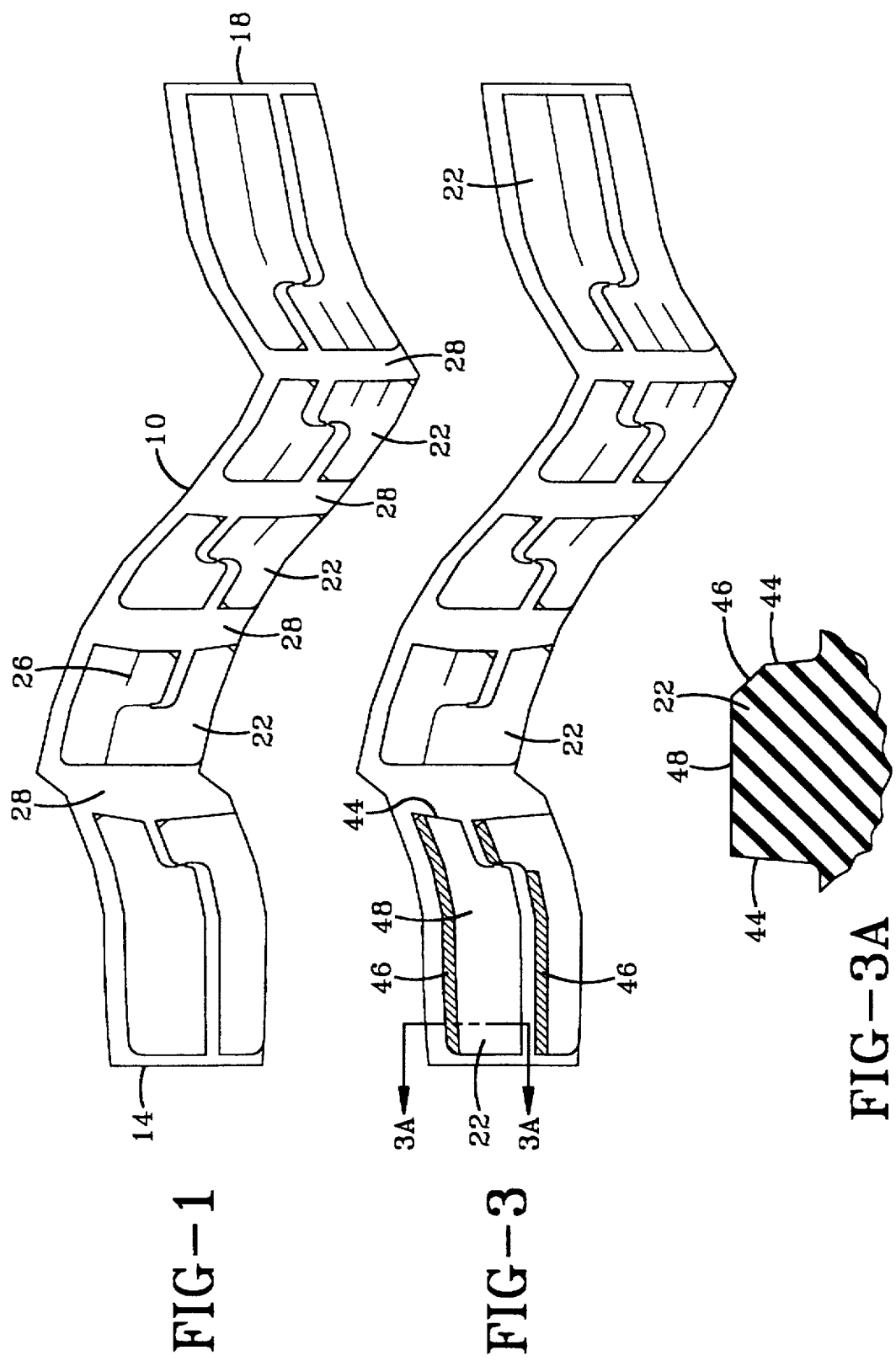
FIG. 1 is a plan view of a portion of a tire tread extending between a first tread edge and a second tread edge.

Referring now to the drawings, which are for purposes of illustrating a preferred embodiment of the invention only, and not for purposes of limiting the invention, FIG. 1 shows a portion of a tire tread 10 that stretches across a tire from the first tread edge 14 to the second tread edge 18. Grooves 28 in the tread 10 channel water away from the contact patch to improve traction on wet road surfaces. Between the grooves 28 are tread elements 22 which extend radially outwardly of the tread 10. The tread 10 has sipes 26, or smaller grooves, to improve traction and other tire performance parameters.

Figure 2:
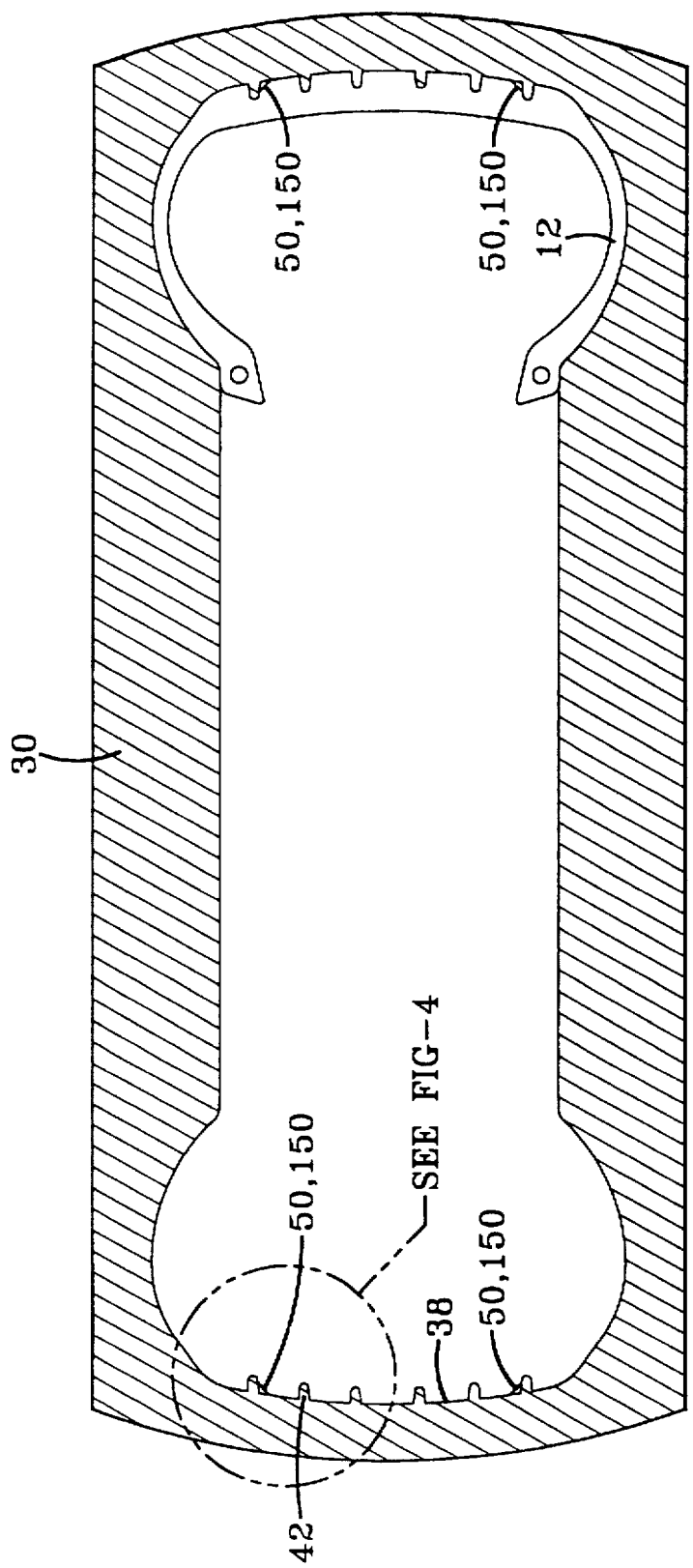
FIG. 2 is a cross-sectional view of a tire mold according to the invention.

With reference to FIGS. 1 and 2, the tire 12 and tire tread 10, is formed and vulcanized in the conventional manner by molding the tire 12 in a tire mold 30. The tire 12 is vulcanized within the mold 30 during the curing process.

One important and commonly monitored aspect of tire performance is the magnitude of certain forces and torques generated by rotation of the tire 12 against the road surface. Two of these are referred to as "residual cornering force" (RCF) and "residual self-aligning torque" (RSAT). Because these forces and torques are well known in the tire art, only a brief discussion will be made here.

Although the lateral forces generated by a tire can be reduced to zero with respect to a forward velocity vector at a small slip angle (called the neutral slip angle), RSAT remains about the axis vertical to the contact patch of the tire. At a slip angle where self-aligning torque is zero, a lateral force, RCF, exists and may cause the tire to drift in a lateral direction. RCF or RSAT may be affected by the shape and design of the tread 10. RCF or RSAT may be reduced or increased by chamfering or otherwise modifying certain areas of the tire treads elements 22.

FIG. 2 shows a cross-sectional view of a schematic of a tire mold 30. The right side of the tire mold 30 in FIG. 2 is shown with a tire 12 mounted therein while, for ease of illustration, the left side of the tire mold 30 is shown without the tire 12. The interior surface of the tire mold 30 is the negative impression of the tire tread 10. Because the tire mold 30 is the negative impression of the molded tire tread 10, recesses 38 in the tire mold 30 form the radially-protruding tread elements 40 in the tread 10. Likewise, the protruding extensions 42 in the tire mold 30 form the grooves 28 in the tire around the tread 10.

RCF or RSAT may be adjusted and controlled by chamfering or beveling certain portions of the tire tread 10. FIG. 3 shows a tire tread 10 with certain edges 46 chamfered. The chamfering of the edges 46 can affect the RCF and/or RSAT levels in the tire. In the specific tread configuration of FIG. 3, chamfering the edges 46 creates a negative shift in the tire RCF and/or RSAT level. Tire treads 22 may be chamfered by grinding the tire after unacceptable levels of RCF and/or RSAT have been measured, but such grinding is costly and time-consuming.

Figure 4:
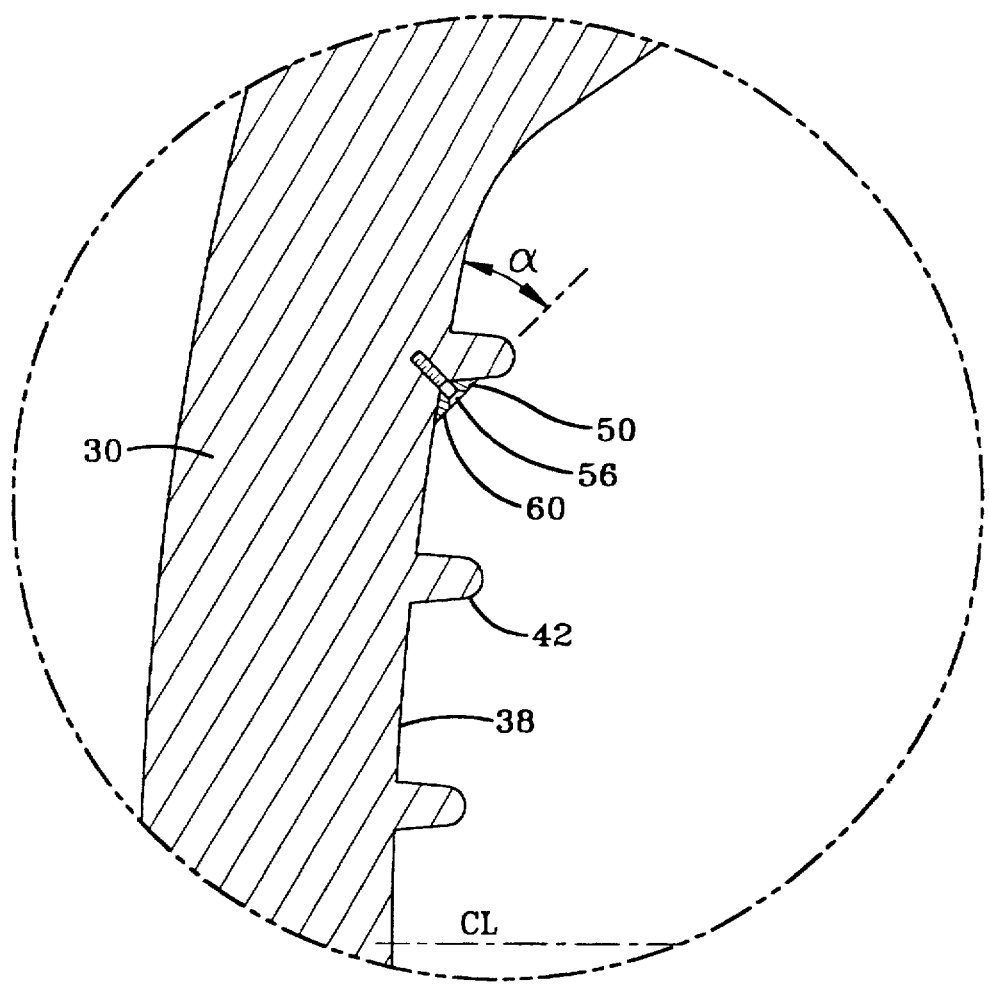
FIG. 4 is an enlarged view of a portion of the mold illustrated in FIG. 2.
Figure 5:
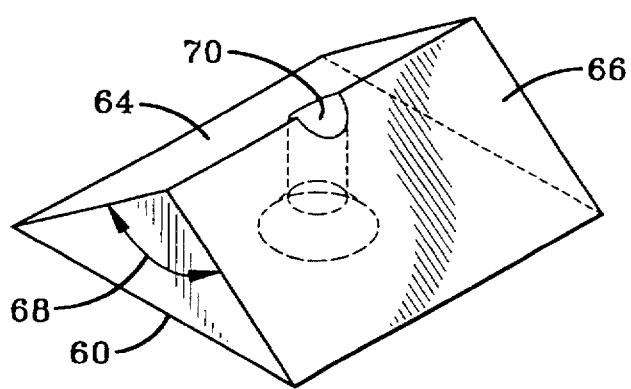
FIG. 5 is a perspective view of an insert according to the invention.

Tire RCF and/or RSAT can be modified by using a mold with a modified tread pattern, but the design and manufacture of a new tire mold takes a significant period of time. This delay could idle expensive production equipment and delay the delivery of the finished product to the consumer. The invention herein described eliminates both of these expensive and time-consuming alternatives by providing a third and fourth alternative. In the third alternative, inserts 50 are placed within an existing tire mold to modify the RCF and/or RSAT characteristics of a tire. As illustrated in FIGS. 2, 4 and 5, the inserts 50 may be mounted into a tire mold 30 using any acceptable mounting means, including adhesives or mechanical fasteners such as a bolt or screw 56.

With reference to FIG. 5, a typical insert 50 is shown. The insert 50 has a first side 64, a second side 66 and a chamfer side 60. The chamfer side 60 is the portion of the insert 50 which contacts the tire tread 10 in the mold 30 during the curing process and alters the shape of the tire tread 10. In the preferred embodiment, the insert 50 includes a hole or bore 70 through which an associated screw 56 or bolt can be received for securing the insert 50 to the tire mold 30.

Another important advantage of the invention is the savings in tire development time. Also, the cost of tire development may be reduced by a decrease in hardware costs, such as the cost of a new tire mold 30. Finally, the tire inserts 50 may be used in tire production molds 30 to slightly alter existing tire type production to bring production tires within industry specifications for RCF and/or RSAT.

With reference to FIG. 4, the inserts 50 are typically made of the same material as the mold with which they are intended to be used. For example, one preferred material for the inserts 50 is aluminum. The angle α that the chamfer surface 60 of the insert 50 makes with the tire mold's surface 38 is chosen for each tire application, but is generally between 40 degrees and 85 degrees. While the insert 50 has been shown as mounted in the outermost recesses 38 of the tire mold 30, inserts 50 can be utilized in any portion of the tire mold 30, and inserts 50 can be used in multiple recesses 38 of a tire mold 30 at the same time.

Figure 6:
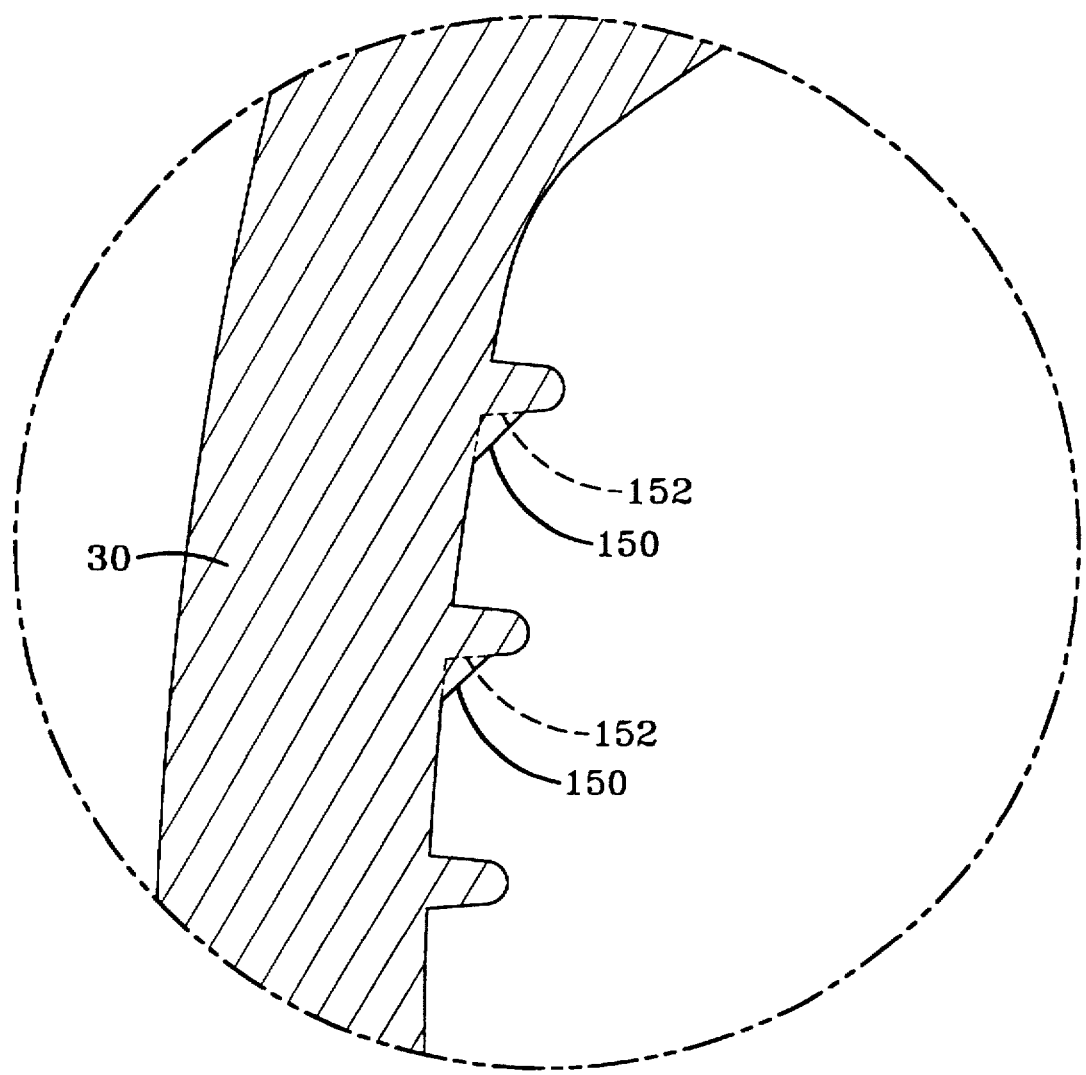
FIG. 6 is an enlarged view of a portion of a tire mold utilizing a preferred embodiment of the invention; and, FIG. 7 is a graph showing some experimental results of tires incorporating the invention.

With reference to FIG. 6, in the fourth and preferred alternative, the tire mold 30 is originally produced with chamfering means for chamfering the tread elements. The chamfering means takes the form of mold portions 150 which are located in the tire mold at points where a chamfer might be later required. Preferably, a number of the edges of the tire tread elements 22 are chamfered as the edges 46 in FIG. 3. To adjust or modify RCF and/or RSAT, selected mold portions 150 may be partially or entirely removed from the mold by grinding the mold portions 150 out of the tire mold 30 along dotted line 152. This has essentially the same effect of altering the tire RCF and/or RSAT as adding inserts 50 as described above, but is generally more efficient for the tire manufacturing and development process.

In either inventive approach it will be appreciated that the resultant chamfer portion 46 need not and preferably does not extend to the full depth of the tread element 22. The tread elements 22 when new have a more flexible structure which is believed to be a factor which can effect the RCF or RSAT more dramatically when the tread is new and at full depth. As the tire wears the effect of RCF or RSAT as it relates to tread element flexibility is reduced. Therefore, the chamfer portion 46 must perform its modifying RCF or RSAT function most when the tread is new. As the tread elements 22 wear down, the chamfer portion 46 decreases in size to the point of nonexistence. As this occurs, the ground contacting surface 48 of the element 22 increases tending to retard the rate of tread wear. This feature is considered an important benefit on those treads 10 where the RCF and RSAT modification requirements diminish as a function of increased tread wear.

With reference to FIG. 7, tires incorporating the invention have demonstrated excellent results. In FIG. 7, the term "CONT" refers to a control tire, the term "OSSH" refers to the tire's outside shoulder, the term "TRAIL" refers to the trailing edge of an element, the term "LEAD" refers to the leading edge of the element, and the term "RCF" refers to residual cornering force. The "y axis" of the graph lists the force of the RCF in newtons Experimental test results utilizing a Goodyear Tire and Rubber Company Eagle RS-A tires of size P205/55R16 tires are illustrated. In each case discussed herein or illustrated in FIG. 7, the terminology is defined as looking at a tire mounted on the right hand side of a vehicle.

As illustrated in FIG. 7, tread elements having no chamfering was a control tire and generated RCF values in the amount of about 30 newtons. The chamfers were 2 mm by 2 mm at an α angle of 45°.

Tread elements having similar chamfering on the tire's outside shoulder, trailing edge produced a moderate negative shift in the RCF value in the amount of 15 to 35 newtons.

Tread elements having chamfering on the tire's inside shoulder, trailing edge produced a moderate positive shift in the RCF value in the amount of about 43 newtons.

Using a combination of the above chamfer locations provides the capability to increase or decrease the RCF or RSAT characteristics of the tire.

Tread elements having chamfering on the tire's inside shoulder, leading edge produced a moderate negative shift in the RCF value in the amount of about 30 newtons.

The above described test results, along with FIG. 7, demonstrates that the invention is effective to modify, either in the positive or negative direction, a tire's RCF values.

The invention has been described with reference to the preferred embodiment. Obviously, modifications and alterations will occur to others upon a reading and understanding of the specification. It is intended by applicant to include all such modifications and alterations insofar as they come within the scope of the appended claims or the equivalents thereof.

Having thus described the invention, it is now claimed:

1. A tire mold for modifying residual cornering force or residual self-aligning torque of a tire, said tire mold comprising:

molding means for molding treads, said molding means having a plurality of recesses for forming tread elements, each tread element having two or more edges, a plurality of tread element forming recesses having one or more portions for forming chamfered corners along one or more tread element edge, the chamfer corner forming portions being selectively partially or completely removable for modifying the residual cornering force or self-aligning torque of the molded tire.

2. The tire mold of claim 1 wherein a majority of the recesses for forming a tread element have a chamfer forming portion at one or more edge of each tread element prior to selectively removing chamfer forming portions to modify the residual cornering force or residual self-aligning torques.

3. A tire mold for modifying residual cornering force or residual self-aligning torque of a tire, said tire mold comprising:

molding means for molding treads, said molding means having a plurality of recesses for forming tread elements, each of the recesses being defined by side walls for forming edges on the tread elements; and an insert, said insert being securable within at least one of said plurality of recesses, said insert including a chamfer side for forming a chamfer on the tread element formed by said at least one recess.

4. The tire mold of claim 3 wherein said insert is selectively removable and securable within said at least one recess in said molding means.

5. The tire mold of claim 3 wherein said insert is made of the same material as said mold.

6. The tire mold of claim 3 further comprising attaching means for attaching said insert to said molding means.

7. The tire mold of claim 6 wherein said attaching means is a screw.

8. The tire mold of claim 6 wherein said attaching means is an adhesive.

* * * * *